United States Patent [19]

Miyamoto et al.

[11] Patent Number: 4,957,799
[45] Date of Patent: Sep. 18, 1990

[54] REINFORCING LAYERS FOR BIAS TIRES

[75] Inventors: Jiro Miyamoto, Itami; Takashi Nakasai, Takarazuka; Yukio Komai, Kunta, Japan

[73] Assignee: Toyo Tire & Rubber Co., Ltd., Osaka, Japan

[21] Appl. No.: 238,817

[22] Filed: Aug. 31, 1988

[30] Foreign Application Priority Data

Aug. 31, 1987 [JP] Japan ................. 62-218154

[51] Int. Cl.⁵ .................. B60C 9/20; B32B 5/12
[52] U.S. Cl. .................. 428/114; 152/529; 152/536
[58] Field of Search .......... 152/536, 529; 428/114, 428/105

[56] References Cited

U.S. PATENT DOCUMENTS 4,155,394 5/1979 Shepherd et al. .......... 152/556 X
4,602,666 7/1986 Kabe et al. .............. 152/536 X

FOREIGN PATENT DOCUMENTS 43563 1/1982 European Pat. Off. ....... 152/536
2536018 5/1984 France .................... 152/536

Primary Examiner—Alexander S. Thomas
Attorney, Agent, or Firm—Wenderoth, Lind & Ponack

[57] ABSTRACT

Reinforcing layers for bias tires comprising a laminated structure of a steel cord ply and composite cord plies made of aramid yarns and nylon yarns, said composite cord plies being disposed radially outwardly of the steel cord ply maintaining a full space between steel cords and composite cords and a nominal total denier of said composite cords being in the range of 4,000–10,000.

3 Claims, 1 Drawing Sheet

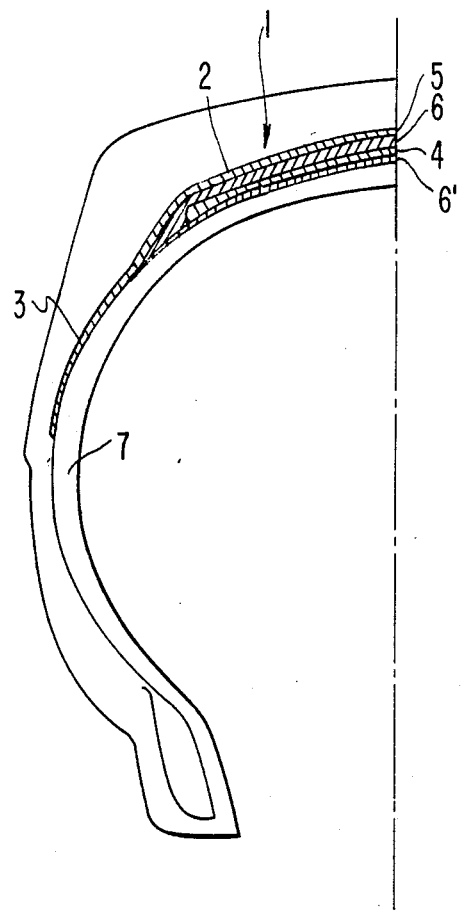

REINFORCING LAYERS FOR BIAS TIRES

BACKGROUND OF THE INVENTION

1. Field of the Invention:

This invention relates to an improvement of reinforcing layers such as breakers and the like for bias tires.

2. Prior Art:

In recent years, for large sized bias tires used on gravel and unimproved roads in mines, quarries and the like there have been used a breaker layer including at least one breaker ply which comprises composite cords made by twisting together aramid yarns and nylon fibers, instead of conventional steel cords as disclosed in the Japanese Patent Application laid-open No. 61-205501.

With the above breaker layer, when the treads impact on stones or hard objects in running, the breaker layer can diminish stresses impressed on the tread rubber and reduce damage to the tread. Said composite cords are free from corrosion and are hardly subjected to fibrillation and compression fatigue. Under more rough conditions, however, the conventional bias tires having such breaker layers are liable to be cut through by broken stones and the like which results in cord breakage and strength reduction of the breaker layer.

SUMMARY OF THE INVENTION

It is therefore an object of the present invention to provide reinforced layers for bias tires which are superior in cut resistance and fatigue resistance even under severe conditions, while keeping the meritable characteristics peculiar to the aforesaid composite cords.

Our research has revealed that reinforcing layers comprising only composite cord plies are superior in tensile strength but inferior in cut resistance and fatigue resistance under severe conditions. On the other hand, it has been well known that conventional reinforcing layers comprising only steel cord plies have been inferior in edge separation resistance and corrosion resistance.

After conducting research into solving the above problems, the present invention adopts a laminated structure of steel cord plies and composite cord plies which are disposed with a given space between steel cords and composite cords.

That is, the present invention provides reinforcing layers comprising a steel cord ply and at least one ply of composite cord plies made of aramid yarns and nylon yarns which is laminated radially outwardly of a steel cord ply, while maintaining a full space between steel cords and composite cords. Said cord space between steel cords and composite cords is preferably 0.5-5 times that of the steel cord diameter. In the case of the cord space being less than 0.5 times, a large shearing strain is induced between the two cords which are greatly different in modulus and consequently there occurs ply separation.

On the contrary, the more the cord space is enlarged, the more the shearing strain per unit thickness between adjacent two cords is reduced, and consequently ply separation hardly occurs. When the cord space is over 5 times of the steel cord diameter, however, the efficiency of reinforcement obtained by the cooperation of the steel cords and the composite cords is injured.

In order to obtain a preferable rubber thickness between adjacent plies for maintaining the cord space, it is preferable to arrange a cushion layer made of rubber sheets and the like between adjacent plies in addition to topping rubbers.

Furthermore, in accordance with the present invention, a nominal total denier of the aforesaid composite cords is limited to 4,000 to 10,000 denier. In the case where the nominal total denier is less than 4,000, the strength of the composite cords becomes too low and as a result cut resistance is injured. In the case where it is over 10,000 denier, the cord diameter of composite cords becomes too large and the performances in fatigue resistance and separation resistance are injured. That is, only within a given range of total denier, the laminated structure comprising composite cords and steel cords according to the present invention can achieve good results.

The end counts of the composite cords are preferable in the range of 3.0–7.7/cm at the center portion of the tire. When the end counts is under 3.0/cm, cut resistance is injured. In the case where it is over 7.7/cm, the cord space becomes smaller and ply separation resistance gets worse.

BRIEF DESCRIPTION OF THE DRAWING

The FIGURE is a partial cross-sectional view of a tire according to the present invention.

DETAILED DESCRIPTION OF THE TIRE

Referring to the figure showing one embodiment of a bias tire of 20.5–20 including a reinforcing layer according to the present invention, reference numeral 1 is a reinforcing layer arranged so as to be in contact with a carcass ply 7 in a radially outward position. Said reinforcing layer 1 is composed of a main portion 2 and a supplemental portion 3 located at the both ends of the main portion 2. The main portion 2 of the reinforcing layer is a laminated structure comprising a steel cord ply 4 and a composite cord ply 5 which is disposed radially outwardly of the steel cord ply 4. The steel cord ply 4 is laminated with cushion rubber layers 6 and 6' at both sides. Both ends of the main portion 2 of the composite cord ply 5 are extended along the carcass ply 7 and constitutes the supplemental portion 3 of the reinforcing layer which terminates in the vicinity of a maximum tire width portion.

Comparative tests were conducted, and the results are shown in the following Table 1 and Table 2. Table 2 shows results of comparative examples. Note of asterisks in the Tables:

* The end counts are at the center portion of the tire.

* In the cord space column, (a) indicates multiples to the steel cord diameter, and (b) indicates actual diameter of the space.

* The durability after actual running is indicated in the form of an index by setting the running hour of the tire in the comparative example 2 having two steel cord plies to be 100.

As apparent from Table 2, the tire in the comparative example 2 comprising only steel cords became unusable at an early stage due to the occurence of rust induced by water penetration through a cut damages of the tire.

The tire in the comparative example 1 comprising only composite cords became unusable since there occurred a cut-through, which reveals the tires inferiority in cut resistance. Furthermore, as the case may be, tires having reinforcing layers made of the combination of composite cords and steel cords, as apparent from the comparative example 3, there occurred cut damages which induced the reduction of tire durability even compared with the steel cords, when the total denier of the composite cords is under 4,000. In the case of the total denier being over 10,000, there occurred ply separation as shown in the comparative example 4.

Conversely, as apparent from the embodiments shown in Table 1, when the total denier is within the preferable range, cut-through is prevented and tire durability is improved. Besides, when comparison is made between the embodiments and the comparative examples 3 to 8, it will be also admitted that the end counts of composite cords and the cord space between composite cords and steel cords are important in order to accomplish more advanced reinforcing layers in accordance with the present invention.

While the present invention has been described in its preferred embodiments taking a breaker as an example, it is to be understood that the present invention is applicable to any other reinforcing layers e.g. for side walls, chafers and the like.

TABLE 1

| | | | EMBODIMENTS | | | | |
|---|---|---|---|---|---|---|---|
| | | | 1 | 2 | 3 | 4 | 5 |
| Breaker cord | composite cord | number of plies | 2 | 2 | 2 | 2 | 2 |
| | | denier of fiber | | | | | |
| | | aramid | 1500 d/2 fbrs | 3000 d/2 fbrs | 1500 d/2 fbrs | 1500 d/2 fbrs | 1500 d/2 fbrs |
| | | nylon | 1260 d/1 fbr | 2520 d/1 fbr | 1260 d/1 fbr | 1260 d/1 fbr | 1260 d/1 fbr |
| | steel cord | number of plies | 1 | 1 | 1 | 1 | 1 |
| | | structure | 4 + 9 + 14 × 0.175 mm | 4 + 9 + 14 × 0.175 mm | 4 + 9 + 14 × 0.175 mm | 4 + 9 + 14 × 0.175 mm | 4 + 9 + 14 × 0.175 mm |
| | | cord diameter (mm) | 1.2 | 1.2 | 1.2 | 1.2 | 1.2 |
| Breaker | *end counts of composite cords (number/cm) | | 5.8 | 3.0 | 7.7 | 5.8 | 5.8 |
| | *end counts of steel cords (number/cm) | | 5.2 | 5.2 | 5.2 | 5.2 | 5.2 |
| | breaker strength (by index) | | 97 | 97 | 113 | 97 | 97 |
| | *cord space between composite cords and steel cords | a | 1.7 | 1.7 | 1.7 | 0.5 | 5 |
| | | b(mm) | (2.0) | (2.0) | (2.0) | (0.6) | (6.0) |
| | total denier of composite cords (D) | | 4260 | 8520 | 4260 | 4260 | 4260 |
| *Durability after actual running | | | 114 | 105 | 110 | 102 | 115 |
| Reason for interruption of test | | | complete wear | cut-through | complete wear | cord cut | complete wear |

TABLE 2

| | | | COMPARATIVE EXAMPLES | | | |
|---|---|---|---|---|---|---|
| | | | 1 | 2 | 3 | 4 |
| Breaker cord | composite cord | number of plies | 2 | — | 2 | 2 |
| | | denier of fiber | | | | |
| | | aramid | 1500 d/2 fbrs | — | 1500 d/1 fbr | 3000 d/2 fbrs |
| | | nylon | 1260 d/1 fbr | — | 1260 d/1 fbr | 2520 d/2 fbrs |
| | steel cord | number of plies | — | 2 | 1 | 1 |
| | | structure | — | 4 + 9 + 14 × 0.175 mm | 4 + 9 + 14 × 0.175 mm | 4 + 9 + 14 × 0.175 mm |
| | | cord diameter (mm) | — | 1.2 | 1.2 | 1.2 |
| Breaker | *end counts of composite cords (number/cm) | | 5.8 | — | 5.8 | 2.0 |
| | *end counts of steel cords (number/cm) | | — | 5.2 | 5.2 | 5.2 |
| | breaker strength (by index) | | 47 | 100 | 84 | 81 |
| | *cord space between composite cords and steel cords | a | — | — | 1.7 | 1.7 |
| | | b(mm) | | | (2.0) | (2.0) |
| | total denier of composite cords | | 4260 | — | 2760 | 11040 |
| *Durability after actural running | | | 33 | 100 | 80 | 88 |
| Reason for interruption of test | | | cut-through | lifting of breaker by rust & last stage of chipping | cut-through | separation |

| | | | COMPARATIVE EXAMPLES | | | |
|---|---|---|---|---|---|---|
| | | | 5 | 6 | 7 | 8 |
| Breaker cord | composite cord | number of plies | 2 | 2 | 2 | 2 |
| | | denier of fiber | | | | |
| | | aramid | 3000 d/2 fbrs | 1500 d/2 fbrs | 1500 d/2 fbrs | 1500 d/2 fbrs |
| | | nylon | 2520 d/1 fbr | 1260 d/1 fbr | 1260 d/1 fbr | 1260 d/1 fbr |
| | steel cord | number of plies | 1 | 1 | 1 | 1 |
| | | structure | 4 + 9 + 14 × 0.175 mm | 4 + 9 + 14 × 0.175 mm | 4 + 9 + 14 × 0.175 mm | 4 + 9 + 14 × 0.175 mm |
| | | cord diameter (mm) | 1.2 | 1.2 | 1.2 | 1.2 |

TABLE 2-continued

| | | | | | |
|---|---|---|---|---|---|
| Breaker | *end counts of composite cords (number/cm) | 2.0 | 8.5 | 5.8 | 5.8 |
| | *end counts of steel cords (number/cm) | 5.2 | 5.2 | 5.2 | 5.2 |
| | breaker strength (by index) | 81 | 119 | 97 | 97 |
| | *cord space between composite cords and steel cords   a b(mm) | 1.7 (2.0) | 1.7 (2.0) | 0.3 (0.4) | 5.8 (7.0) |
| | total denier of composite cords | 8520 | 4260 | 4260 | 4260 |
| *Durability after actural running | | 83 | 97 | 91 | 100 |
| Reason for interruption of test | | cut-through | separation | cord cut & separation | separation |

We claim:

1. Reinforcing layers for bias tires including at least two cord plies disposed radially outwardly of a carcass layer, said cord plies comprising a steel cord ply and at least one ply of composite cord plies made of aramid yarns and nylon yarns and having a nominal total denier of 4,000–10,000, said composite cord ply being laminated radially outwardly of said steel cord ply, wherein a cord space is maintained between steel cords and composite cords in the range of 0.5–5.0 times the diameter of the steel cords.

2. Reinforcing layers for bias tires as claimed in claim 1, wherein the end counts of the composite cords are in the range of 3.0/cm–7.7/cm at the center portion of the tire.

3. Reinforcing layers for bias tires including at least two cord plies disposed radially outwardly of a carcass layer, said reinforcing layers comprising a main portion having two ends and a supplemental portion located at both ends of said main portion, said main portion being a laminated structure comprising a steel cord ply and at least one ply of composite cord plies made of aramid yarns and nylon yarns and having a nominal total denier of 4,000–10,000, said composite cord ply being laminated radially outwardly of said steel cord ply, wherein a cord space is maintained between steel cords and composite cords in the range of 0.5–5.0 times the diamter of the steel cords, said composite cord ply of said main portion having ends which extend from both ends of said main portion along the carcass layer to constitute said supplemental portion of said reinforcing layer.

* * * * *